(12) United States Patent
Ding et al.

(10) Patent No.: US 9,130,932 B2
(45) Date of Patent: Sep. 8, 2015

(54) HYBRID NETWORK APPLICATION ARCHITECTURE

(75) Inventors: Jihui Ding, Bridgewater, NJ (US); Dhiman Karmaker, Lawrenceville, NJ (US); Sudarshan Reddy, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 186 days.

(21) Appl. No.: 13/584,450

(22) Filed: Aug. 13, 2012

(65) Prior Publication Data

US 2014/0047517 A1 Feb. 13, 2014

(51) Int. Cl.
*H04L 29/06* (2006.01)
*H04L 12/14* (2006.01)
*H04L 29/08* (2006.01)

(52) U.S. Cl.
CPC .......... *H04L 63/083* (2013.01); *H04L 12/1453* (2013.01); *H04L 67/02* (2013.01)

(58) Field of Classification Search
CPC ............ H04L 63/0838; H04L 63/0853; H04L 63/0884; H04L 63/166; H04L 63/083
USPC ................ 726/3–5, 2, 9, 10, 26, 27; 713/156; 709/203, 217, 23
See application file for complete search history.

(56) References Cited

U.S. PATENT DOCUMENTS

| | | | |
|---|---|---|---|
| 8,595,752 B1 * | 11/2013 | Fioravanti et al. | 719/328 |
| 2004/0114590 A1 * | 6/2004 | Harris | 370/389 |
| 2008/0268815 A1 * | 10/2008 | Jazra et al. | 455/411 |
| 2009/0276771 A1 * | 11/2009 | Nickolov et al. | 717/177 |
| 2010/0037303 A1 * | 2/2010 | Sharif et al. | 726/6 |
| 2010/0058366 A1 * | 3/2010 | Swildens | 719/329 |
| 2012/0096493 A1 * | 4/2012 | Hassell et al. | 725/39 |
| 2012/0159357 A1 * | 6/2012 | Lim et al. | 715/760 |
| 2013/0074067 A1 * | 3/2013 | Chowdhry | 718/1 |
| 2013/0091559 A1 * | 4/2013 | Thun | 726/9 |
| 2013/0278627 A1 * | 10/2013 | Selles et al. | 345/629 |

OTHER PUBLICATIONS

Martin Johns et al., Biting the Hand That Serves You: A Closer Look at Client-Side Flash Proxies for Cross-Domain Requests, 2001, Springer, vol. 6739, pp. 85-103.*
Jim Conallen, Modeling Web application architectures with UML, Oct. 1999, ACM, vol. 42, Issue 10, pp. 63-70.*

(Continued)

*Primary Examiner* — Bradley Holder
*Assistant Examiner* — Fahimeh Mohammadi (57) ABSTRACT

A hybrid-model network application includes a native component that provides user-level access to features of a networked computing device and a web client component that provides access to web services of a server. The network application causes the networked computing device to receive content from the server. The content includes user interface content to be rendered by the web client component and code content associated with the user interface content that uses a native function of the networked computing device. The content is displayed in a user interface by way of the web client component. A request, associated with the code content, is received from a user interacting with the user interface. The device handles the request for use of the native function by the native component.

25 Claims, 8 Drawing Sheets

(56) References Cited

OTHER PUBLICATIONS

Chris Dennett et al., Framework for Distributed Network Simulation and State Propagation, Sep. 6-8, 2010, IEEE, pp. 143-148.*

Philip Buonadonna et al., Queue Pair IP: A Hybrid Architecture for System Area Networks, May 2002, ACM, vol. 30 Issue 2, pp. 247-256.*

* cited by examiner

HYBRID NETWORK APPLICATION ARCHITECTURE

BACKGROUND

A user of an electronic device may install a rich-client application on the electronic device to add new functionality. However, the application may become out-of-date. Sometimes the user may be required to update the application, such as by installing a new version, to obtain new features, address deficiencies in a prior version and/or to preserve the functioning of existing features. Update notifications and installation may become annoying for the user as well as requiring the use of valuable bandwidth. Available storage space on the electronic device may be another potential issue. Therefore, in some cases, the user may elect to stop using the application. In other cases, the user may decline to perform the updates to the application, thereby compromising its long term effectiveness and applicability. As an alternative, a web-client centric application may be utilized. However, such an application has its own deficiencies including, for example, potential performance, functionality, network bandwidth or latency, and device interfacing.

DETAILED DESCRIPTION

Network service providers make network applications available to help both prepaid and postpaid customers monitor their usage of communications services. These network applications may allow for the display of real time statistics, such as call minutes used, bytes of data transferred, and number of messages sent or received. The network applications may further provide features to allow users to change price plans based on the indicated usage as well as provide options for bill payment. Verizon Wireless, for instance, accomplishes these self-serve features using the My Verizon Mobile application.

Because of the dynamic nature of the telecom industry, including its operational and regulatory environment, ongoing and frequent changes to usage plans, features, and/or payment options are typical. For example, the network service provider may change aspects of how it offers plans, features, and/or payment options. It is desirable that such changes are publicized or propagated to users in an efficient and timely manner.

In some cases, network applications are implemented in a rich-client model. In the rich-client model, network content may be included in the network application itself. The included network content may include user interface flow (i.e., which portions of the user interface are displayed in what order based on what events), displayed images and text, as well as application logic programmed according to the way that the network service provider offers plans, features, and/or payment options. As rich-client applications locally implement the user interface flow and network content that is displaying to the user, any updates in functionality may require corresponding changes to the network content included within the network application. Thus, to use the changed functionality, a new version of the network application may be made available for the customer to download and install.

As an alternative, a web-client model of application development may be used instead of the rich-client model. In the web-client model, a web browser application may be navigated to a network server hosting a web version of the network application. For example, a user may bookmark a universal resource locator (URL) at which the network application may be available. Because the content of the network application is hosted by the network server, any updates in functionality may require corresponding changes to the hosted network content. As a result, in the web-client model the application may be updated by changing the web-based network content available on the hosting network server.

While web-client applications may address the shortcomings associated with frequent downloading of new versions of rich-client applications, functionality suffers due to limitations of the web-client model. For example, web-client applications may lack permission or the ability to access native application programmer interfaces (APIs) such as Google Maps or Verizon Navigator®. As another potential disadvantage, access to cookies or to private phone information may be unavailable via web-client applications. As yet another potential deficiency of web-client applications, performance may be inferior to that of rich-client applications in part due to the network bandwidth and latency issues resulting from the downloading of bandwidth-intensive network content such as image files.

To address the perceived shortcomings of both rich-client applications and web-client applications, a hybrid-client model for application development may be utilized. In the hybrid-client model, an application may be implemented using both a native component and a web component, combined with additional new previously unavailable technologies, to make use of the most robust aspects of the rich-client model and the web-client model.

Similar to as provided for in web-client applications, the hybrid-client application may utilize the web component to receive and display network content retrieved from a network server. The web component thereby allows for the network server to remain responsible for providing aspects of the user interface, allowing the client to display those aspects of the network content without implementing the underlying user interface flow. This inclusion of the web component frees up the hybrid-client application from having to internally implement a user interface and other aspects of the network application that are likely to become out of date.

Moreover, the native component may be configured to allow for client-specific functionality to be available to the hybrid-client application as is possible for rich-client applications. For example, the native component may allow network applications to have access to features such as native APIs, web cookies and Google Maps or Verizon Navigator®.

As another example, the native component may allow access to additional device and user information such as international mobile subscriber identity (IMSI) identifiers, mobile device numbers (MDNs), subscriber identification module (SIM) unique serial number (ICCID), mobile equipment identifier (MEID), etc. The retrieved native device and account-specific information may in turn be sent to the network server via the web component for further processing. For instance, the native component may allow for automatic authentication of the network application by sharing private network device information with the network server by way of the web component.

The hybrid-client application may also make use of additional technologies to implement the functionality of the network application. As explained in detail below, by using Hypertext Markup Language (HTML) version 5 and Cascading Style Sheets (CSS) 3 instead of Java or Java 2 Platform Enterprise Edition (J2EE), canvas objects may be used to algorithmically render a portion of a user interface, avoiding the download of high-bandwidth images and thereby decreasing network application response time. Moreover, as explained in detail below, rather than merely using HTTP, as done in a traditional web-client model, technologies such as JavaScript, Asynchronous JavaScript and Extensible Markup Language (XML) (AJAX) and JavaScript Object Notation (JSON) may be used to implement asynchronous calls to a network server to provide updated content without requiring a full load of an entire new web page.

Because the hybrid-client application may be configured to receive and display network content from a network server, an update to the hybrid-client application may be performed by updating network content to be delivered by the network server to the hybrid-client application. Accordingly, the hybrid-client application may receive and display the updated network content without requiring the user to download a new version of the network application.

As a further advantage, because the hybrid-client application uses a web component rather than locally implementing the user interface flow and network content that is being displayed to the user, the hybrid-client application may be implemented using fewer software components than would be required for a rich-client application.

As yet a further advantage, the hybrid-client application may provide security features beyond those of a web-client application. For example, when the hybrid-client application has finished using web features of the web component, the hybrid-client application can access native features of the networked computing device to automatically clear internal browser cookies and browser cache to purge sensitive information from the networked computing device. This would not be possible from a web-client application, because the web-client application would not be able to access the native features of the device necessary to purge the data. Accordingly, by clearing internal browser cookies and browser cache, security of the hybrid-client application may be improved over that of a web-client because sensitive information is purged and not retained on the networked computing device.

As an example, for a specific rich-client application re-implemented as a hybrid-client application, the application size was reduced from approximately 6 megabytes to approximately 1.5 megabytes, the initial page load time was reduced from approximately 15 seconds to approximately 10 seconds, and image data loaded from the network was reduced from approximately 2 megabytes to approximately 50 kilobytes.

In sum, the hybrid-client model of application development provides the best aspects of both rich-client model of application development and web-client model of application development, while at the same time minimizing the deficiencies of either. While network service provider network applications are illustrated herein, it should be noted that the hybrid-client model of application development is not limited to network service provider network applications. Rather, network service provider applications are only one example of network applications that may require frequent updates to their logic, content, pricing, bug fixes, and/or features. For example, the hybrid-client model of application development may be suitable for other types of applications, such as lottery applications, online merchants, and social networking.

Figure 1:
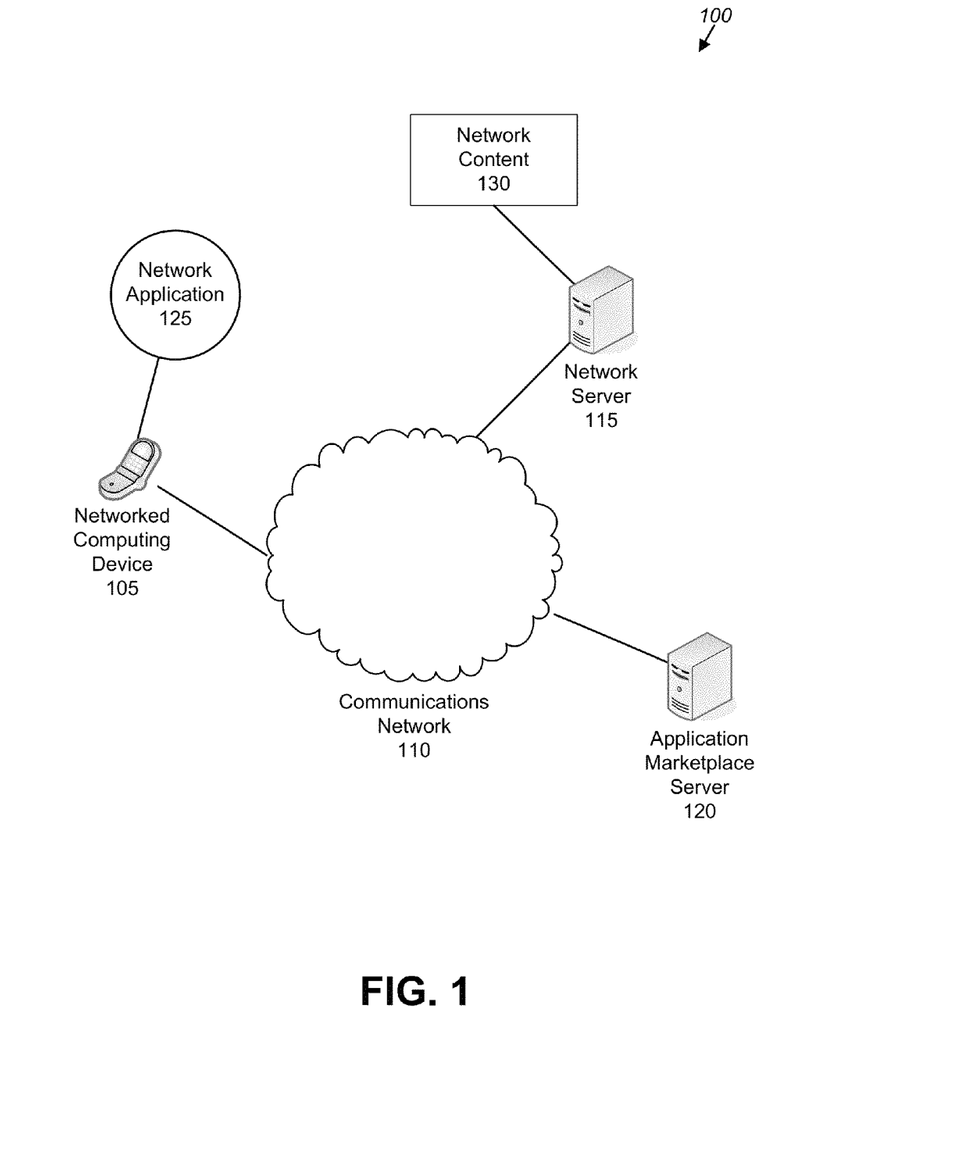
FIG. 1 illustrates an exemplary communications system including a networked computing device configured to use a network application and connected to a communications network.

FIG. 1 illustrates an exemplary communications system 100 including a networked computing device 105 configured to use a network application 125 and connected to a communications network 110. Examples of a typical networked computing device 105 include a smartphone, laptop computer, or tablet computer. The networked computing device 105 may be implemented as a combination of hardware and software, and may include one or more software applications or processes for causing a networked computing devices 105 to perform the operations of the networked computing device 105 described herein. The networked computing device 105 may be configured to utilize an application marketplace server 120 to download the network application 125, as well as to use the network application 125 to interact with a network server 115 and receive network content 130.

The communications network 110 may provide communications services, such as packet-switched network services (e.g., Internet access and/or VoIP communication services), and circuit-switched services (e.g., plain old telephone service (POTS) and/or integrated services digital network (ISDN) services) to devices such as the networked computing device 105. Correspondingly, the networked computing device 105 on the communications network 110 may have its own unique identifier which may be used to indicate, reference, or selectively connect to other networked computing devices 105 on the communications network 110. Exemplary unique device identifiers may include MDNs, Uniform Resource Identifiers (URIs), Internet Protocol (IP) addresses, media access control (MAC) addresses, SIM identifiers, international mobile equipment identity (IMEI) identifiers, and IMSI identifiers, among others.

The network server 115 may be configured to house user information relating to the users of the networked computing devices 105. For example, in the case of a network service provider type of network application 125, the network server 115 may be configured to store information associated with the networked computing device 105 such as call minutes used, bytes of data transferred, and number of messages sent or received. Additionally, the network server 115 may further be configured to make changes to a user's subscriber information, such as changes to a number of minutes or an amount of bandwidth subscribed to by the networked computing device 105. The network server 115 may further be configured to receive requests to send information related to subscriber usage of network features, and may respond to these requests by returning appropriate data to the user's networked computing device 105. This data returned to the networked computing device 105 may be a form of network content 130. In many cases, network servers 115 configured to house user information related to network usage may be under the control of the provider of the network services being used.

For other types of network applications 125 the network server 115 may be configured to selectively store and interact with different forms of data. As an example, in the case of a lottery network application 125, the network server 115 may provide information such as historical lottery results and odds of winning, and may allow for the purchase of lottery tickets for various drawings. Such network servers 115 may be under the control of a third party. For example, a network server 115 configured to provide lottery information may be under the control of an entity providing the lottery.

The application marketplace server 120 may be configured to store a plurality of applications that may be downloaded to the networked computing device 105. When executed by the networked computing device 105, the downloaded applications may be used by the networked computing device 105. The applications available from the application marketplace server 120 may be organized into various categories, such as games, entertainment, education, sports, social networking, and shopping. Some applications may be free, while other applications may require payment before they may be downloaded. Exemplary application marketplace servers 120 may include the Android marketplace for Android devices controlled by Google Inc., and the Apple iTunes App Store for iOS devices controlled by Apple. Inc.

One such application available through the application marketplace server 120 may be a network service provider network application 125. The network service provider network application 125 may be configured to allow for the display of real time statistics, such as call minutes used, bytes of data transferred, and number of messages sent or received. The network application 125 may further be configured to allow users to make changes to their subscriber information, such as changes to the number of minutes or amount of bandwidth to which the networked computing device 105 is subscribed. In order to provide relevant data for display, the network application 125 may send requests to the network server 115 to receive subscriber information related to the usage and/or subscriber information of the networked computing device 105. This information returned to the networked computing device 105 may be another form of network content 130.

In addition to the aforementioned types of data, the network content 130 may also include application logic, user interface flow, and displayed images and/or textual data to be utilized by the network application 125.

Figure 2:
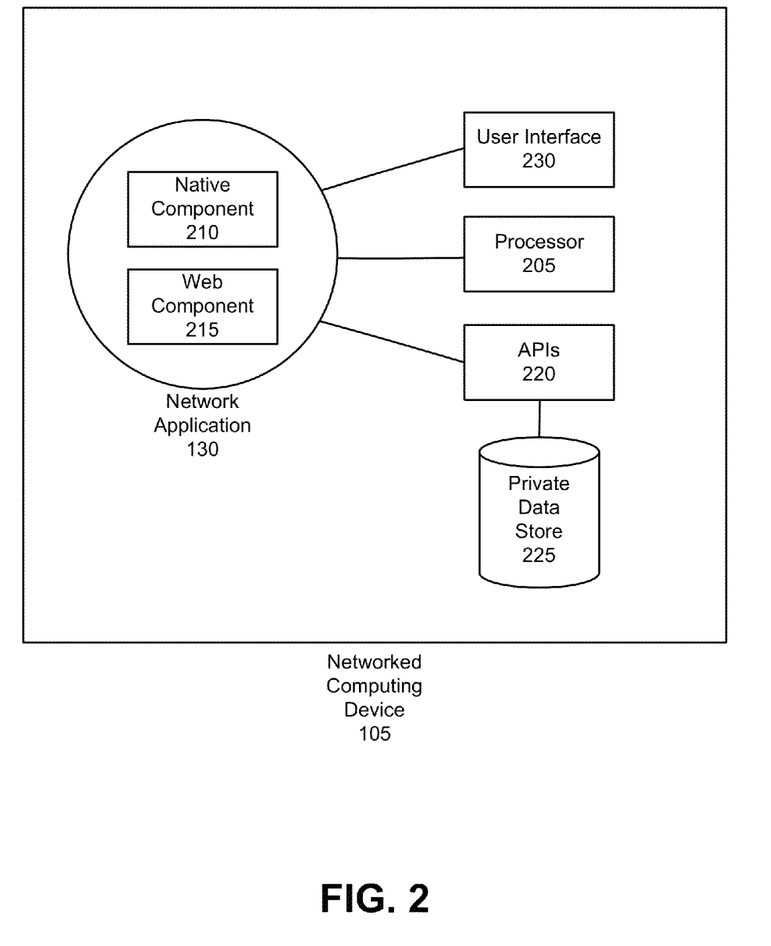
FIG. 2 illustrates an exemplary networked computing device configured to execute a network application implemented according to a hybrid-client model.

FIG. 2 illustrates an exemplary networked computing device 105 including a processor 205 and configured to execute a network application 125 implemented according to a hybrid-client model. The network application 125 may include a native component 210 and a web component 215, and may execute on one or more processors 205 of the networked computing device 105.

The native component 210 may include a portion of the network application 125 configured to run as a native application on the networked computing device 105. When running as a native application, the native component 210 may have substantially the full permissions of the user for accessing features of the networked computing device 105. For example, similar to a rich-client application, the native component 210 may include code that is executable in an environment with permission sufficient to access user-level APIs 220. These APIs may provide access to functionality of the networked computing device 105, such as such as Google Maps, web cookie storage, and private data store 225. Access to private data store 225 may allow for reading of private information by the network application 125, including, for example IMSI, MDN, ICCID and MEID identifiers.

The web component 215 may be used to send and receive network content 130 in communication with the network server 115. The web component 215 may further be configured to display a user interface 230 based on the received network content 130. Exemplary web components 215 may include the WebView component of the Android operating system or the UIWebview webkit component of the Apple iOS operating system. In some examples, the web component 215 may include functionality configured to support various web standards, including, but not limited to HTML 5, CSS 3, JavaScript, AJAX and JSON.

In many cases, due to security concerns, the web component 215 may run in a permission-restricted "sandbox" environment, providing access to a limited or otherwise controlled set of resources in which the web component 215 may run. Accordingly, the "sandbox" environment may provide a level of access less than full user-level access to the features of the networked computing device 105. This level of access lower than user-level access may be more limited than for the native component 210 of the hybrid-client application or the rich-client application. For example, the "sandbox" environment may provide limited access to device memory or to other native system functionality.

As mentioned above, the network content 130 may include application logic, user interface flow, and displayed images and/or textual data to be utilized by the network application 125. More specifically, the network content 130 may include user interface 230 content to be rendered by the web component 215 and code content associated with the user interface 230 content requiring use of the native component 210 to access native functionality of the networked computing device 105. A user may interact with the user interface 230 provided by the web component 215 according to the network content 130, and may make a request associated with the code content using the native function of the networked computing device. For example, the code content may include JavaScript code referencing native functionality that is included in HTML web content to be displayed by the web component 215. When this code content using the native function is requested to be used (such as via a user interaction with the network application 125), the native component 210 may accordingly execute the associated native functionality with adequate permission to perform the requested action.

As an even more specific example, the hybrid-model network application 125 may create a web component 215 instance using the native component 210 of the hybrid-model network application 125. The hybrid-model network application 125 may then launch the web component 215. The web component 215 may be configured to load a web page containing content such as HTML, JavaScript, CSS and image files. Responsive to the on page load complete HTML event that is triggered upon completion of loading of the web page (e.g., in response to the onload event of the HTML Body tag), the native component 210 of the hybrid-model network application 125 may inject additional JavaScript functions into the HTML document of the web page received by the web component 215. The additional JavaScript functions may define an interface configured to expose native application services to the web page, the native application services including functionality such as Google Maps, phone call functionality, ability to open an external web browser, and ability to clear web cookies and web cache information. This additional JavaScript functionality may be referred to as a JavaScript bridge. When a user interacts with the network application 125 the web component 215 may accordingly call one of the injected JavaScript functions of the JavaScript bridge, which in turn calls back into the native component 210 which then executes the associated native functionality with adequate permission to perform the requested action.

Figure 3:
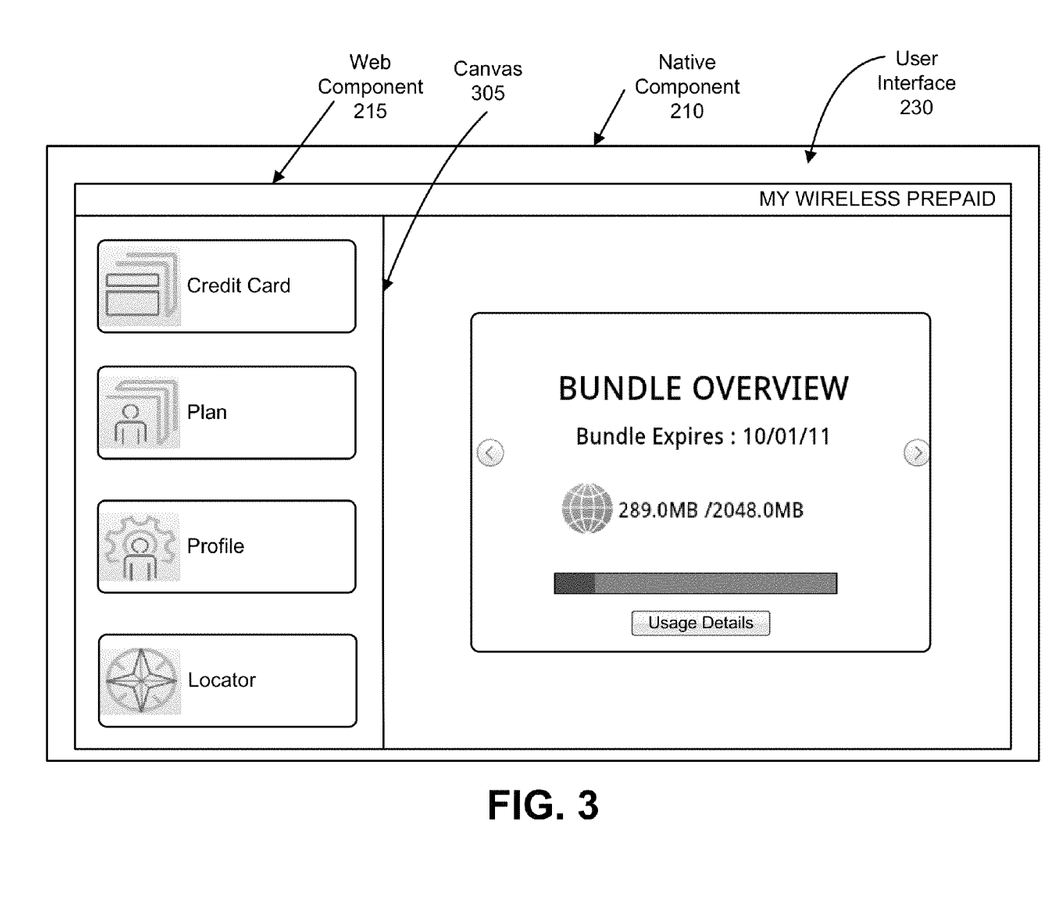
FIG. 3 illustrates an exemplary user interface of a network application implemented according to the hybrid-client model and including a canvas object.

FIG. 3 illustrates an exemplary user interface 230 of a network application 125 implemented according to the hybrid-client model and including a canvas object 305. The network application 125 includes both a native component 210 configured to execute on the networked computing device 105 to provide user-level access to APIs 220 of the networked computing device 105 as well as a web component 215 configured to communicate with a network server 115.

In addition to simple rendering of network content 130 such as images, the web component 215 may be configured to provide for more sophisticated procedural content rendering. For example, the web component 215 may be configured to provide canvas objects 305, which may be used to algorithmically render at least a portion of a user interface 230. The user interface 230 displayed by the web component 215 may include one or more canvas objects 305, each configured to render at least a portion of the user interface 230.

The canvas object 305 may be utilized to graphically present usage information in a procedurally rendered image. The canvas object 305 may be programmed according to network content 130 downloaded from the network server 115, and may include an algorithm coded in the network content 130 to render the display based on usage information received from the network server 115. In the illustrated example, the algorithm may be configured to render a plurality of buttons, i.e., the credit card, plan, profile and locator buttons. These buttons may be rendered algorithmically, such as by a function that receives button text, a button icon, and a location on the canvas, and accordingly draws the button on the canvas object 305 based on the received information.

By using the canvas object 305, the network application 125 may render the multiple button images algorithmically, thereby avoiding downloading of larger image file including the entire button contents and text. Such canvas objects 305 may provide advantages over simple image content, because procedurally rendering an image according to a coded algorithm may avoid the downloading of these higher-bandwidth images, with a corresponding reduction in response time and bandwidth usage of the user interface 230.

Moreover, the web component 215 may further support the use of asynchronous calls to the network server 115, which may be made by the web component 215 to request updated usage data. The updated usage data may be returned as network content 130 and may be used to update only a portion of the user interface 230, without downloading an entire refreshed user interface 230 from the network server 115. These updates may accordingly reduce bandwidth usage and decrease user interface 230 response time, by avoiding the performance of a full refresh of the user interface 230 as may be required by a web-client application.

These techniques may be combined in some instances. For example, a canvas object 305 may be used to render other graphics algorithmically, such as the bar graph indicative of data usage of the user. By use of asynchronous calls to the network server 115, updated usage data may be received and used to update the graphics indicative of data usage of the user.

Figure 4:
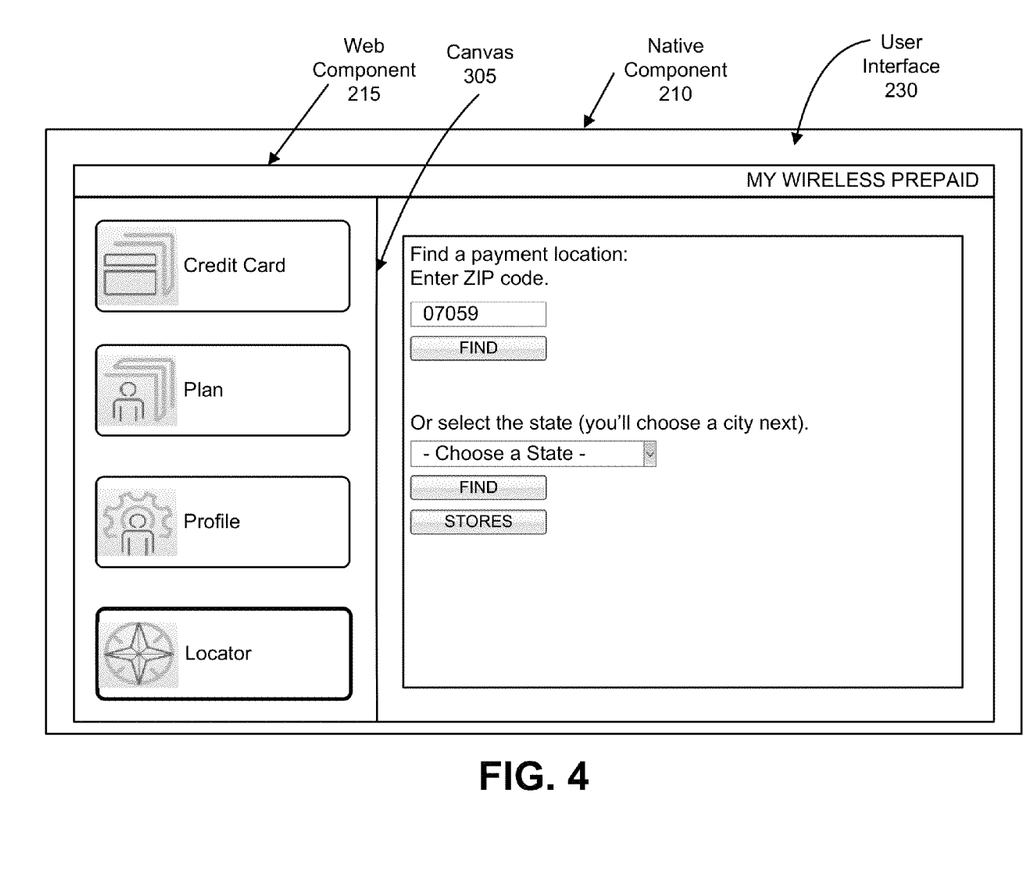
FIGS. 4-6 illustrate an exemplary user interface of a network application implemented according to the hybrid-client model providing for a partial user interface update and access to native functionality.
Figure 5:
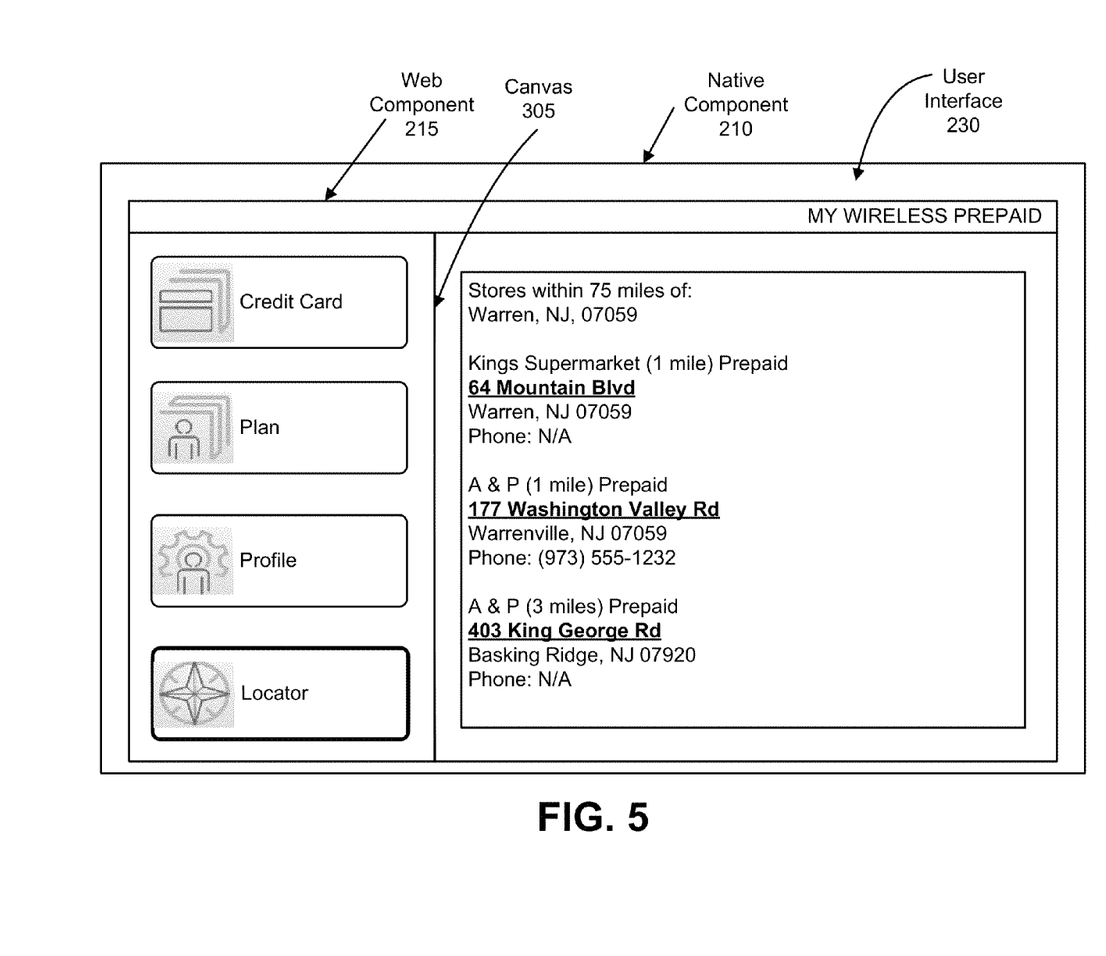
Figure 6:
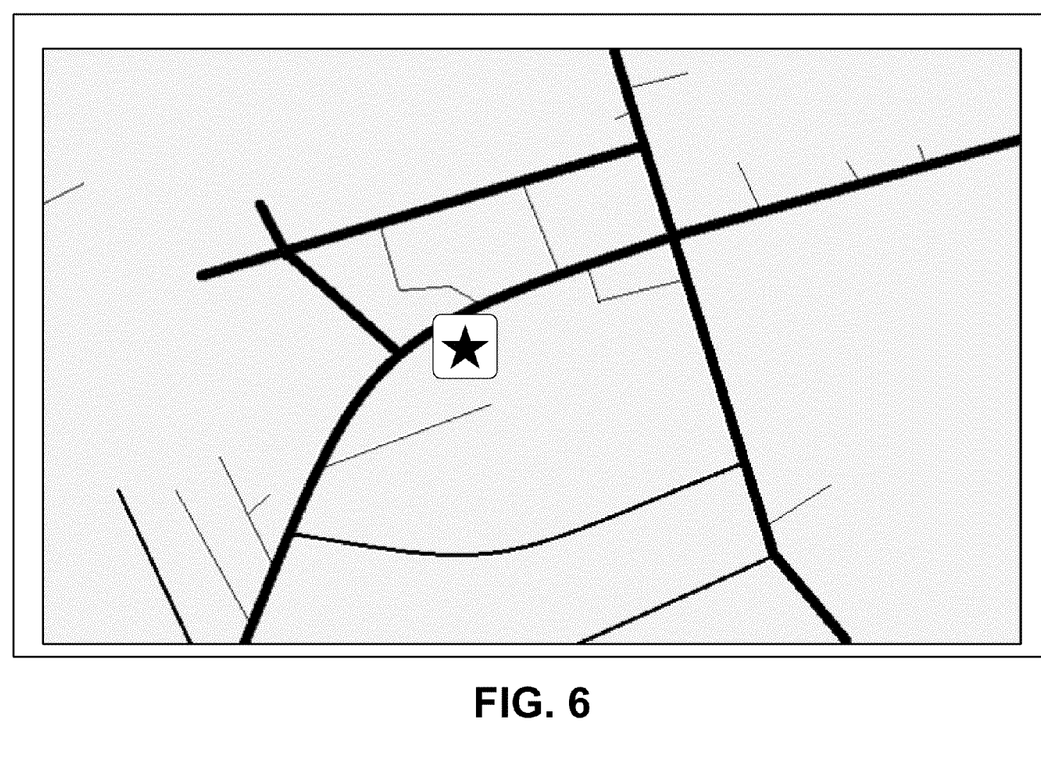

FIGS. 4-6 illustrate an exemplary user interface 230 of a network application 125 implemented according to the hybrid-client model providing for a partial user interface 230 update and access to native functionality. As shown in FIG. 4, a user may select the locator button from the canvas object 305, and may enter information to locate a local payment location. The information, e.g., an entered ZIP code, may be provided by the web component 215 to the network server 115 using AJAX techniques, such as by way of an XMLHttpRequest HTML object. As shown in FIG. 5, a portion of the user interface 230 may be updated responsive to the request to provide a listing of local payment locations. The user may interacts with the network application 125 to select one of the payment locations to view on a map, and the web component 215 of the network application 125 may accordingly call one of the injected JavaScript functions of the JavaScript bridge, which in turn calls back into the native component 210 which then executes the associated native functionality with adequate permission to perform the requested action. As shown in FIG. 6, the user interface 230 may be updated responsive to the request to display the mapped location.

Figure 7:
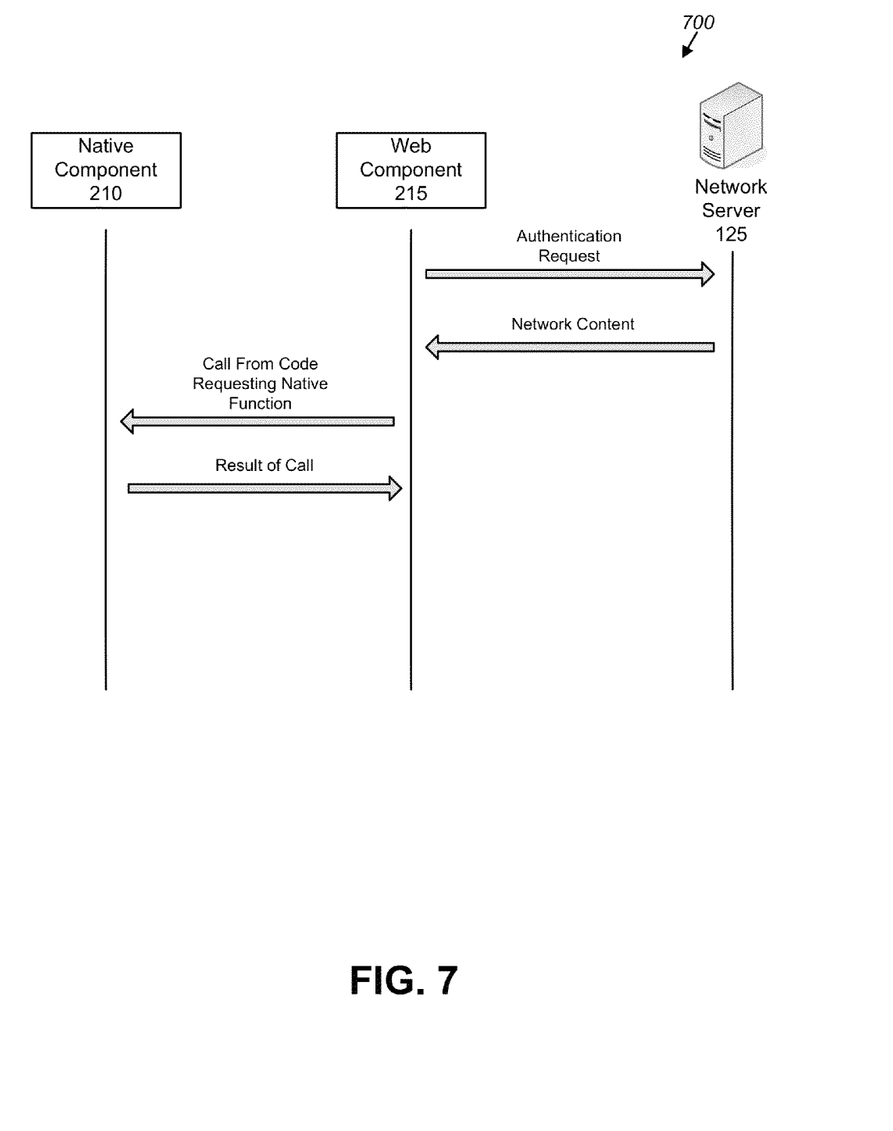
FIG. 7 illustrates an exemplary flow based on a user interaction with a hybrid-model network application.

FIG. 7 illustrates an exemplary flow 700 based on a user interaction with a hybrid-model network application 125. More specifically, the exemplary flow 700 illustrates messages and data flow between a native component 210 of a network application 125, a web component 215 of the network application 125 and a network server 115.

As an exemplary interaction, based on a user request the web component 215 of the network application 125 may send an authentication request to the network server 115. This request may include username and password information entered into a user interface 230 of the network application 125 by a user. The network server 115 may respond to the authentication request and may provide network content 130 to the network application 125 responsive to the authentication request. The network content 130 may include code requiring access to user-level functionality of the networked computing device 105 that is beyond the access level of the web component 215, such as access to private information of the networked computing device 105.

For example, the network content 130 may include JavaScript code embedded in HTML and including calls to user-level functionality of the networked computing device 105. To execute the code requiring access to user-level functionality, the web component 215 may send a message or make a call to the native component 210 to perform the operations associated with the code portion of the network content 130. The native component 210 may perform the operations, and may return to the web component 215 any value resulting from execution of the associated code.

While the exemplary flow 700 illustrates only a simple interaction between the native component 210, the web component 215 and the network server 115, other interactions may be possible. As another example of an interaction between the native component 210 and the web component 215, the network content 130 may include code content configured to obtain private device information from the private data store 225. When this code is selected by user input to a user interface 230 of the web component 215, the native component 210 may be used to access the private data store 225. The native component 210 may further provide the requested private device information to web component 215. The web component 215 may, in turn, perform additional operations on the received data, such as providing the requested private device information to the network server 115. Such an approach may be utilized, for example, to provide for an automatic sign-on procedure for the network application 125.

As yet another example of an interaction between the native component 210 and the web component 215 according to the network content 130, the network content 130 may include code content configured to request to display a map location. The request may accordingly require use of the native component 210 of the network application 125 to access a map interface API 220. The native component 210 may accordingly perform the requested action with the map interface API 220.

As an even further example, if the web component 215 determines that the user has concluded use of the network application 125, the web component 215 may make a call to the native component 210 to cause the native component 210 to call an API 220 to clear a user browsing session, cookies, and/or internal browser history of the web component 215.

By utilizing interactions such as those illustrated in exemplary flow 700, the hybrid-client network application 125 provides the best aspects of both rich-client applications and web-client applications, while at the same time minimizing the deficiencies of either.

By taking advantage of the download of network content 130 from the network server 115, the hybrid-client network application 125 overcomes rich-client issues with requiring users to download new versions of the network application 125 for every update to the network application 125. Moreover, by way of the network content 130, the hybrid-client network application 125 further allows for a client with a relatively lower memory or storage footprint than a full rich-client application.

Further, the hybrid-client network application 125 overcomes security issues with web-client network applications 125 by allowing the native component 210 to clear sensitive data from the networked computing device 105. Moreover, the hybrid-client network application 125 allows for the use of user-level native functionality of the networked computing device 105 that is unavailable to web-client network applications 125. Yet further, by using efficient rendering of image content using canvas objects 305, the hybrid-client network application 125 provided additional advantages over other designs of network application 125 by allowing for the algorithmic rendering and updating of portions of the user interface 230, avoiding the download of high-bandwidth images and thereby decreasing network application response time.

In general, computing systems and/or devices, such as networked computing device 105, network server 115, and application marketplace server 120, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as networked computing devices 105 generally include computer-executable instructions such as the instructions of network application 125, where the instructions may be executable by one or more processors 205. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor 205 of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor 205 of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as private data store 225, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. The network application 125 may be one such computer program product. In some example, the network application 125 may be provided as software that when executed by the processor 205 provides the operations described herein. Alternatively, the network application 125 may be provided as hardware or firmware, or combinations of software, hardware and/or firmware.

Figure 8:
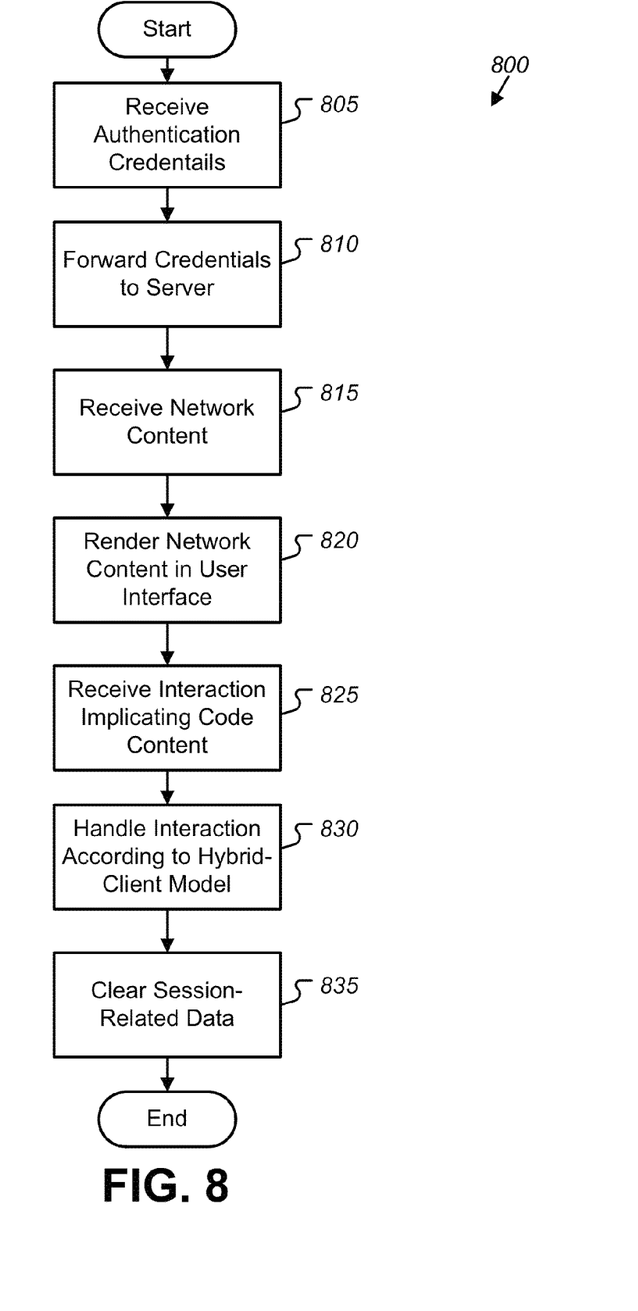
FIG. 8 illustrates an exemplary process flow for a hybrid-client model of a network application executed by a networked computing device.

FIG. 8 illustrates an exemplary process 800 for a hybrid-client model of a network application 125. The process 800 may be performed by various devices, such as by a network server 115 in selective communication over a communications network 110 with a networked computing device 105, the networked computing device 105 executing instructions of a network application 125 using at least one processor 205.

In block 805, the network application 125 receives authentication credentials. For example, the user may enter a username and password into a user interface 230 of the network application 125. Additionally or alternately, the network application 125 may query the networked computing device 105 for information, such as by using a native component 215 of the network application 125 to query a private data store 225 for a unique device identifier of the networked computing device 105. In some instances, the query of the private data store 225 for information is performed automatically to provide for an automatic sign-on procedure for the network application 125.

In block 810, the network application 125 forwards the authentication credentials to the network server 115. For example, the credentials may be encrypted and sent via a logic request to the network server 115 by the web component 215 of the network application 125. Responsive to the request, the network server 115 may validate the request, either locally or through an external system, and may return an appropriate response to the network application 125. In some implementations, the request to the network server 115 may be an HTTPS+POST request, and the response from the network server 115 may be encoded in HTML.

In block 815, the network application 125 receives the network content 130 from the network server 115. The network content 130 may include user interface flow, image data and text data to be displayed in a user interface 230 of the network application 125. As some examples, the network content 130 may include information related to the usage and/or subscriber information of the networked computing device 105, such as call minutes used, bytes of data transferred, and number of messages sent or received. Moreover, the network content 130 may include application logic programmed according to the way that the network service provider offers plans, features, and/or payment options.

In block 820, the network application 125 renders the network content 130 in a user interface 230. Upon receiving the network content 130, the web component 210 of the network application 125 may renders a user interface 230 to display to the user. In some cases, the web component 215 of the network application 125 may utilize HTML 5 and CSS 3 to create a canvas object 305 to render at least a portion of the user interface 230. Use of the canvas object 305 may avoid the download of high-bandwidth images and reducing system response time as compared to Java or J2EE web-clients that download pre-rendered images.

In block 825, the network application 125 receives an interaction of the user with the user interface 230 of the network application 125. As an example, the user may request for the user interface 230 to update a portion of the display, such as to update the display of one or more of call minutes used, bytes of data transferred, or number of messages sent or received. As another example, the user may request to display a map location, where the request is associated with code in the network content 130 using the native component 210 of the networked computing device 105 (e.g., code to access a map interface API 220 of the networked computing device 105). As other examples, the user may select an element of the user interface 230 configures to close the network application 125, or to access another application of the networked computing device 105, or to return to a home screen of the networked computing device 105.

In block 830, the network application 125 handles the interaction of the user with the user interface 230 according to the hybrid-client model. For example, based on the user interaction, the web component 215 may use JavaScript, AJAX and/or JSON to implement an asynchronous call to the network server 115 and to update at least one selected screen area with the latest account information. As another example, based on the user interaction, the web component 215 may request the native component 210 to access at least one native device API 220 to retrieve native device and account-specific information from the private data store 225. This retrieved data may, in turn, be sent to the network server 115 for further processing.

In block 835, the network application 125 clears session-related data. For example, responsive to receipt of an indication to discontinue use of the network application 125, the native component 210 may clear at least one of a user browsing session, cookies, and internal browser history to enhance security. After block 835, the process 800 ends.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device for a hybrid-model network, comprising:
a networked computing device including a hardware processor with a memory configured to connect with a communications network; and
a hybrid-model network application configured to be executed by said hardware processor, said hybrid-model network application including a native component of said networked computing device configured to provide user-level access to features of said networked computing device and a web client component configured to provide access to web services of a server in selective communication with said networked computing device over said communications network, said hybrid-model network application configured to cause said networked computing device to perform operations comprising:

receiving network content from said server, said network content including user interface content to be rendered according to a user interface flow of said web client component;

accessing code content, as part of said native component, associated with said user interface content in response to said web client component making a call to said native component to use a native function executed by said hardware processor of said networked computing device without said native function implementing the user interface flow of said web client component;

automatically authenticating, by way of said web client component, said hybrid-model network application by at least one of forwarding authentication credentials to said server in a login request and providing private device information to said server;

displaying said network content in a user interface by way of said web client component of said hybrid-model network application;

receiving a request from a user interacting with said user interface, said request associated with said code content and using said native function of said networked computing device; and handling said request for use of said native function of said networked computing device by way of said native component of said hybrid-model network application.

2. The device of claim 1, wherein said hybrid-model network application is further configured to inject additional code content into said web client component, said additional code content defining an interface configured to expose said native function, wherein handling said request for use of said native function includes said web client component requesting said native function by accessing said interface.

3. The device of claim 1, wherein said hybrid-model network application is further configured to perform operations comprising:
obtaining private device information by said native component; and
providing said private device information to said server by way of said web client component thereby automatically authenticating said hybrid-model network application.

4. The device of claim 1, wherein said hybrid-model network application is further configured to perform operations comprising:
receiving authentication credentials associated with the user of said networked computing device;
forwarding said authentication credentials to said server in a login request;
receiving a response to said login request including said network content from said server.

5. The device of claim 1, wherein said hybrid-model network application is further configured to perform operations comprising at least one of using a canvas object to algorithmically render at least a portion of said user interface and using asynchronous calls to said server to update at least a portion of said user interface.

6. The device of claim 1, wherein receiving said request from said user interacting with said user interface includes receiving a request to display a map location, said request associated with said code content using said native component of said networked computing device to access said map interface.

7. The device of claim 1, wherein receiving said request from said user interacting with said user interface includes receiving a request to discontinue use of said hybrid-model network application, said request associated with said code content configured to perform operations comprising the web client component making another call to the native component thereby causing the native component to clear at least one of cookies and internal browser history.

8. The device of claim 1, further comprising a networked computing device, wherein said hybrid-model network application is downloaded over said communications network from an application marketplace to a non-transitory memory of said networked computing device.

9. A method for a hybrid-model network, comprising:
receiving network content from a server by a hybrid-model network application, said hybrid-model network application configured to be executed by a networked computing device in selective communication with said server over a communications network, said hybrid-model network application including a native component of said networked computing device configured to provide user-level access to features of said networked computing device to said server and a web client component configured to provide access to web services of said server, said network content including user interface content to be rendered according to a user interface flow of said web client component, and said hybrid-model network application being configured to access code content, as part of said native component, that is associated with said user interface content in response to said web client component making a call to said native component to use a native function of said networked computing device without said native function implementing the user interface flow of said web client component;

automatically authenticating, by way of said web client component, said hybrid-model network application by at least one of forwarding authentication credentials to said server in a login request and providing private device information to said server;

displaying said network content in a user interface by way of said web client component of said hybrid-model network application;

receiving a request from a user interacting with said user interface, said request associated with said code content and using said native function of said networked computing device; and handling said request for use of said native function of said networked computing device by way of said native component of said hybrid-model network application.

10. The method of claim 9, further comprising injecting additional code content into said web client component, said additional code content defining an interface configured to expose said native function, wherein handling said request for use of said native function includes said web client component requesting said native function by accessing said interface.

11. The method of claim 9, further comprising:
obtaining private device information by said native component; and
providing said private device information to said server by way of said web client component thereby automatically authenticating said hybrid-model network application.

12. The method of claim 9, further comprising:
receiving authentication credentials associated with the user of said networked computing device;
forwarding said authentication credentials to said server in a login request;
receiving a response to said login request including said network content from said server.

13. The method of claim 9, further comprising at least one of using a canvas object to algorithmically render at least a portion of said user interface and using asynchronous calls to said server to update at least a portion of the user interface.

14. The method of claim 9, further comprising receiving a request to display a map location from said user interacting with said user interface, said request associated with said code content using said native component of said networked computing device to access said map interface.

15. The method of claim 9, further comprising receiving a request to discontinue use of said hybrid-model network application, said request associated with said code content configured to perform operations comprising the web client component making another call to the native component thereby causing the native component to clear at least one of cookies and internal browser history.

16. The method of claim 9, further comprising downloading said hybrid-model network application over said communications network from an application marketplace to a non-transitory memory of said networked computing device.

17. A non-transitory computer readable medium storing a hybrid-model network application, said hybrid-model network application being executable by a processor to provide operations comprising:
  receiving network content from a server by a networked computing device in selective communication with the server over a communications network, said hybrid-model network application including a native component of the networked computing device configured to provide user-level access to features of said networked computing device to said server and a web client component configured to provide access to web services of said server, said network content including user interface content to be rendered according to a user interface flow of said web client component;
  accessing code content, as part of said native component, that is associated with said user interface content in response to said web client component making a call to said native component to use a native function of said networked computing device without said native function implementing the user interface flow of said web client component;
  automatically authenticating, by way of said web client component, said hybrid-model network application by at least one of forwarding authentication credentials to said server in a login request and providing private device information to said server;
  displaying said network content in a user interface by way of said web client component of said hybrid-model network application;
  receiving a request from a user interacting with said user interface, said request associated with said code content and using said native function of said networked computing device; and
  handling said request for use of said native function of said networked computing device by way of said native component of said hybrid-model network application.

18. The non-transitory computer readable medium of claim 17, further providing for operations comprising injecting additional code content into said web client component, said additional code content defining an interface configured to expose said native function, wherein handling said request for use of said native function includes said web client component requesting said native function by accessing said interface.

19. The non-transitory computer readable medium of claim 17, further providing for operations comprising:
  obtaining private device information by said native component; and
  providing said private device information to said server by way of said web client component thereby automatically authenticating said hybrid-model network application.

20. The non-transitory computer readable medium of claim 17, further providing for operations comprising:
  receiving authentication credentials associated with the user of said networked computing device;
  forwarding said authentication credentials to said server in a login request;
  receiving a response to said login request including said network content from said server.

21. The non-transitory computer readable medium of claim 17, further providing for operations comprising using a canvas object to algorithmically render at least a portion of said user interface.

22. The non-transitory computer readable medium of claim 17, further providing for operations comprising using asynchronous calls to said server to update at least a portion of the user interface.

23. The non-transitory computer readable medium of claim 17, further providing for operations comprising receiving a request to display a map location from said user interacting with said user interface, said request associated with said code content using said native component of said networked computing device to access said map interface.

24. The non-transitory computer readable medium of claim 17, further providing for operations comprising receiving a request to discontinue use of said hybrid-model network application, said request associated with said code content configured to perform operations comprising the web client component making another call to the native component thereby causing the native component to clear at least one of cookies and internal browser history.

25. The non-transitory computer readable medium of claim 17, further providing for operations comprising downloading said hybrid-model network application over said communications network from an application marketplace to a non-transitory memory of said networked computing device.

* * * * *